United States Patent

Gonidec et al.

[11] Patent Number: 5,983,625
[45] Date of Patent: Nov. 16, 1999

[54] PIVOTING DOOR THRUST REVERSER WITH DEFLECTING PASSAGE WITHIN THE DOOR

[75] Inventors: Patrick Gonidec, Sainte Adresse; Guy Bernard Vauchel, Le Havre, both of France

[73] Assignee: Societe Hispano-Suiza, Valin, France

[21] Appl. No.: 08/903,509

[22] Filed: Jul. 30, 1997

[30] Foreign Application Priority Data

Aug. 1, 1996 [FR] France .................................. 96 09705

[51] Int. Cl.⁶ ........................................................ F02K 1/70
[52] U.S. Cl. ...................... 60/226.2; 60/230; 244/110 B; 239/265.29; 239/265.31
[58] Field of Search ................................... 60/226.2, 230; 244/110 B; 239/265.25, 265.27, 265.29, 265.31

[56] References Cited

U.S. PATENT DOCUMENTS

| | | |
|---|---|---|
| 2,944,394 | 7/1960 | Peregrine . |
| 2,997,845 | 8/1961 | Oulianoff . |
| 3,279,182 | 10/1966 | Helmintoller . |
| 3,475,913 | 11/1969 | Mortlock et al. . |
| 3,483,702 | 12/1969 | Ward . |
| 3,605,411 | 9/1971 | Maison et al. . |
| 3,612,401 | 10/1971 | Ellis et al. . |
| 3,699,682 | 10/1972 | Kleckner . |
| 3,739,582 | 6/1973 | Maison . |
| 4,894,985 | 1/1990 | Dubois et al. . |
| 5,267,438 | 12/1993 | Bunel et al. ............................. 60/226.2 |
| 5,297,387 | 3/1994 | Carimali et al. . |
| 5,671,598 | 9/1997 | Standish .................................. 60/226.2 |
| 5,765,362 | 6/1998 | Gonidec et al. ........................ 60/226.2 |

FOREIGN PATENT DOCUMENTS

| | | |
|---|---|---|
| 924283 | 8/1947 | France . |
| 1482538 | 4/1967 | France . |
| 91242 | 5/1968 | France . |
| 1529361 | 10/1968 | France . |
| 2030034 | 6/1970 | France . |
| 2121563 | 1/1972 | France . |
| 2111726 | 6/1972 | France . |
| 2618853 | 7/1989 | France . |
| 2680547 | 2/1993 | France . |
| 1 380 419 | 1/1975 | United Kingdom . |
| 2 254 589 | 10/1992 | United Kingdom . |

*Primary Examiner*—Ted Kim
*Attorney, Agent, or Firm*—Bacon & Thomas, PLLC

[57] ABSTRACT

The present invention relates to a thrust reverser for a turbojet engine having a cowling bounding a gas flow duct, the cowling having at least one reverse thrust opening communicating with the gas flow duct. The thrust reverser has a thrust reverser door with forward and rear portions, a first opening in the forward portion, a second opening in the rear portion and a passage communicating with the first and second openings. The thrust reverser door is pivotally attached to the cowling adjacent to the rear portion of the door so as to be movable between a forward thrust position, wherein the thrust reverser door covers the at least one reverse thrust opening in the cowling such that an inner surface of the thrust reverser door forms a portion of the boundary of the gas flow duct and wherein the first opening is blocked by the cowling, and a reverse thrust position wherein the forward portion of the thrust reverser door extends into the gas flow duct to direct at least a portion of the gas in the gas flow duct into the passage so as to generate a reverse thrust force. A panel is located so as to cover the second opening in the thrust reverser door when the thrust reverser door is in the forward thrust position and to uncover the second opening when the door is in the reverse thrust position.

22 Claims, 18 Drawing Sheets

PIVOTING DOOR THRUST REVERSER WITH DEFLECTING PASSAGE WITHIN THE DOOR

BACKGROUND OF THE INVENTION

The present invention relates to a pivoting door thrust reverser for a turbojet engine, more particularly a thrust reverser having a passage in the pivoting thrust reverser door to deflect gases in a reverse thrust direction.

Turbofan-type turbojet engines are well known in the art and typically comprise a fan at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIG. 1 illustrates a known pivoting door-type thrust reverser associated with the fan cowling of a turbofan-type turbojet engine. As illustrated, the forward portion of the fan cowling 1 defines the outer limits of the bypass flow duct and is generally concentrically arranged about the turbojet engine (not shown). The cowling 1 comprises an external cowling panel 4 and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct through which the bypass air flow passes in the direction of the arrow.

The fan cowling also comprises a thrust reverser, illustrated generally at 2, and a rear fairing 3. The thrust reverser 2 comprises a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the bypass flow duct airstream so as to redirect at least a portion of the bypass flow through an opening in the fan cowling in a direction that has a reverse thrust component.

An actuator 8 for moving the door 7 between its forward and reverse thrust positions may comprise a hydraulic cylinder mounted to the frame 6, and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream fairing 3.

A plurality of thrust reverser doors 7 may be incorporated into the fan cowling, such doors being circumferentially spaced around the periphery of the fan cowling. A portion of the fan cowling axially extends between forward and rear portions of the cowling between circumferentially adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted on the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflector 13 projects from the inner panel 11 of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

The above-described known thrust reversers incur major drawbacks because of the aerodynamic size constraints on the flow passages cleared by the thrust reverser doors which cause the doors to be biased in the open, thrust reversing direction. The full cross-section of the flow passages must be larger than the associated duct cross-section in a plane taken upstream, or forward, of the door on account of the pressure losses due to the gas flow deflection since the downstream, or rearward portion of the duct unobstructed by the inwardly protruding portion of the thrust reverser doors is minimized in order to produce an appropriate reverse thrust force.

Quite obviously, the bias of the doors toward the open or reverse thrust position is a safety drawback. The reverser would be safer if the thrust reverser door was biased towards the closed or forward thrust position. This consideration also applies to a thrust reverser door that would tend to close again under pressure even if they were partially deployed towards the thrust reversing position.

In some cases, the effect of the pressure acting on the thrust reverser door is such that very high stresses are transmitted through the thrust reverser door actuators between their attachment points to the upstream portion of the cowling and the doors. As a consequence, this structure and the door locking mechanisms must be undesirably heavy.

U.S. Pat. No. 3,612,401 discloses an outer flow panel hinged at its rear edge in which the forward edge pivots into the gas flow duct. In this configuration, the outer and inner panels operate separately from each other to direct the flow towards the front of the cowling.

French Patent Application to 2 121 563 discloses a jet engine thrust reverser having a pivoting door in which the rear edge of the pivoting door extends into the annular gas flow duct while the forward edge portion extends outwardly from the cowling.

SUMMARY OF THE INVENTION

The present invention relates to a thrust reverser for a turbojet engine having a cowling bounding a gas flow duct, the cowling having at least one reverse thrust opening communicating with the gas flow duct. The thrust reverser has a thrust reverser door with forward and rear portions, a first opening in the forward portion, a second opening in the rear portion and a passage communicating with the first and second openings. The thrust reverser door is pivotally attached to the cowling adjacent to the rear portion of the door so as to be movable between a forward thrust position, wherein the thrust reverser door covers the at least one reverse thrust opening in the cowling such that an inner surface of the thrust reverser door forms a portion of the boundary of the gas flow duct and wherein the first opening is blocked by the cowling, and a reverse thrust position wherein the forward portion of the thrust reverser door extends into the gas flow duct to direct at least a portion of the gas in the gas flow duct into the passage so as to generate a reverse thrust force. A panel is located so as to cover the second opening in the thrust reverser door when the thrust reverser door is in the forward thrust position and to uncover the second opening when the door is in the reverse thrust position.

Since the thrust reverser door is pivotally connected to the cowling adjacent to its rear portion, the pressurized gases within the gas flow duct acting on an inner surface of the door will urge to the forward thrust position, thereby preventing inadvertent deployment of the thrust reverser. The configuration of the thrust reverser according to the present invention not only achieves an increase in the safety of the thrust reverser, but also reduces the weight of the assembly, since it reduces the forces normally acting on the door thereby enabling the locking mechanism, and the actuating mechanism to be made lighter than the known prior art systems.

No portion of the thrust reverser door extends radially outwardly beyond an outer surface of the cowling in both the forward and reverse thrust positions. Again, this feature increases the safety and reduces the weight of the system, since it negates any effect of the external airflow flowing over the cowling acting on the door and causing it to inadvertently deploy to the thrust reverser position.

DETAILED DESCRIPTION OF THE PREFERRED EMBODIMENT

Figure 1:
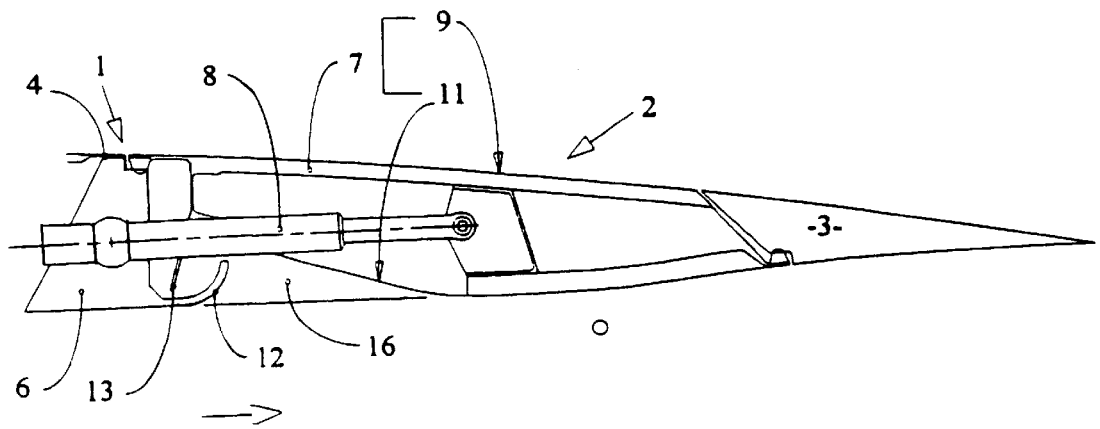
FIG. 1 is a partial, longitudinal cross-sectional view of a known thrust reverser illustrating the thrust reverser door in the forward thrust position.

A first embodiment of the present invention is illustrated in FIGS. 2–6 wherein it can be seen that thrust reverser door 20 is pivotally attached to a cowling forming an outer boundary of gas flow duct 28 so as to pivot about generally transversely extending pivot axis 21 between forward and reverse thrust positions. A forward portion 22 of the cowling connects one end of actuator 23 which has an extendible and retractable rod pivotally attached to the thrust reverser door 20. As can be seen, the pivot axis 21 is located adjacent to the rear portion of the thrust reverser door 20. Actuator 23 may comprise a mechanical, hydraulic, or electrical actuator and moves the thrust reverser door 20 in a generally counter clockwise direction about the axis 21, as illustrated in the figures between the forward thrust position, illustrated in FIGS. 2 and 4 and the reverse thrust positions, illustrated in FIGS. 3 and 5. Such movement causes the forward portion 24 of the door 20 to move radially inwardly into the gas flow duct 28 adjacent to the outer surface of the jet engine housing 25. Seal 26 is located on the forward portion 24 of the door 20 and seals against the deflection edge 12 of the forward porion 22 of the cowling when the door 20 is in the forward thrust position.

The thrust reverser door has an inner panel with an inner surface 27, an outer panel with an outer surface 29, a front opening 36, a rear opening 32 with a passage 37 interconnecting the front and rear openings. When in the forward thrust position, the outer surface 29 forms a portion of the outer surface of the cowling, while inner surface 27 forms a portion of the outer boundary of the gas flow duct 28. When in the forward thrust position, the pressurized gas within the gas flow duct 28 bears against inner surface 27 exerting a force on the thrust reverser door 20 urging it in a clockwise direction about the pivot axis 21 to maintain the door in the forward thrust position. As the thrust reverser door begins to move to the reverse thrust position, a portion of the gas flow will pass into the passage 37. However, at this initial point, the thrust reverser door remains self-closing over a given angle of travel. When the thrust reverser door no longer makes sealing contact with the cowling structure, the gas flow pressure is applied against the inside of the inner panel 27 (within the passage 37), which force is significantly counteracted by the force acting on the inner surface of outer panel 29. The angle through which the thrust reverser door 20 will remain self-closing depends upon the geometry of the inner panel 27 subjected to the gas flow pressure passing between the forward portion 24 and the jet engine housing 25, until its re-closing component in combination with the re-closing component of the inside of the outer panel 29 no longer overcomes the opening component applied to the inside of the inner panel 27. The specific dimensions of the inside surface of the outer panel 29 and the position of the pressure center of this surface relative to the pivot axis 21 will be determined according to the particular desired characteristics of each particular application of the invention.

Figure 3:
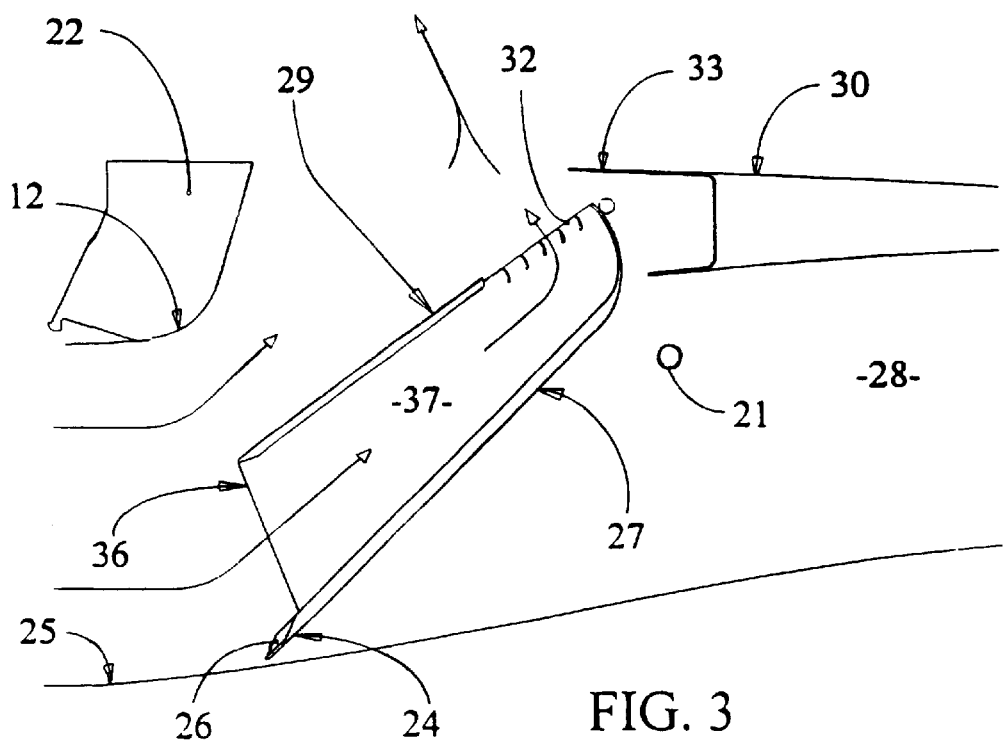
FIG. 3 is a view similar to FIG. 2, but illustrating the thrust reverser door in the reverse thrust position.

As clearly evidenced from the figures, no portion of the thrust reverser door 20 projects outwardly from the cowling in either the forward, or the reverse thrust position. This feature becomes significant if the thrust reverser is located on a jet engine having low ground clearance, or if the engine is adjacent to the wing, fuselage, or tail surfaces of the aircraft. As best illustrated in FIG. 3, in the reverse thrust position, the portion of the gases flowing through the passage 37 and exiting through the second opening 32 will act on the portion of the gases flowing between the thrust reverser door 20 and the deflecting surface 12 to impart to these gases a forward direction, thereby enhancing the reverse thrust effect.

Figure 2:
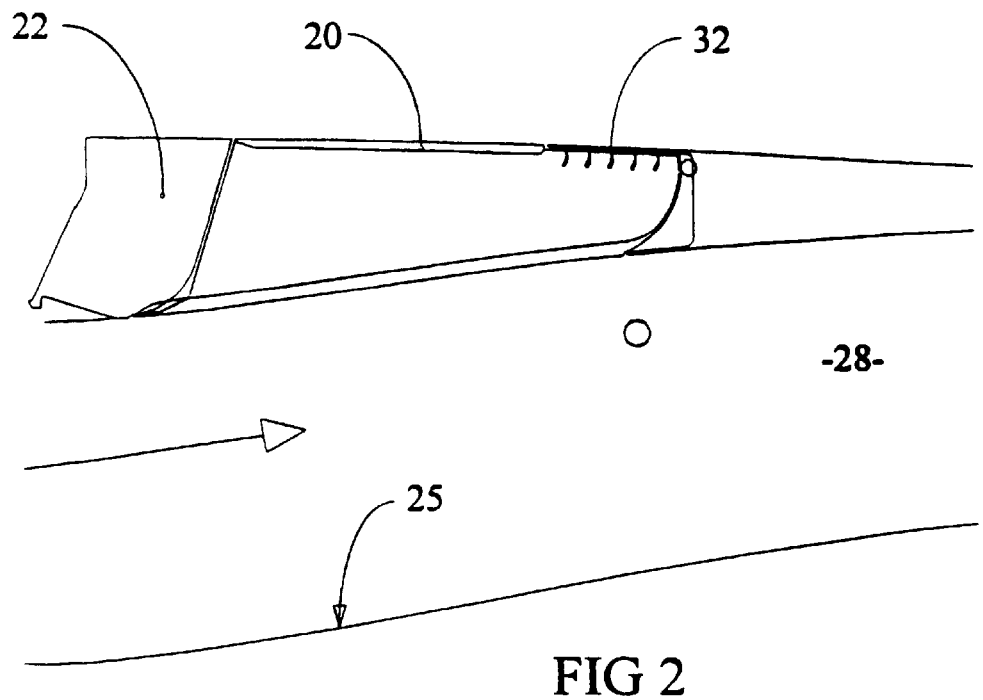
FIG. 2 is a partial, longitudinal cross-sectional view of a thrust reverser according to the present invention with the thrust reverser door in the forward thrust position.

A panel 33, which in this particular embodiment forms a portion of rear cowling 30 covers the second opening 32 when the door 20 is in the forward thrust position, as best illustrated in FIG. 2. When the thrust reverser door pivots to the reverse thrust position, the panel 33 uncovers the second opening 32, as illustrated in FIG. 3. The contour of the panel 33 may be configured to impart a desired directional component to the thrust reverser gases, if desired. The panel 33 may be formed integrally with the rear cowling 30, or may be fabricated from several components.

The thrust reverser according to the present invention may be associated with known thrust reverser doors of different, or similar sizes in order to improve the directing of the gas flow in the reverse thrust direction and to minimize the disturbance on aircraft control from the reverse thrust flow. Even if a plurality of thrust reverser doors of the present invention are utilized, the thrust reverser openings may be of different sizes in both width and/or length, and the doors may assume different pivot orientations and opening angles. These parameters assure optimal direction of the reverse thrust gas flow and minimize disturbances on the aircraft structure.

Figure 6:
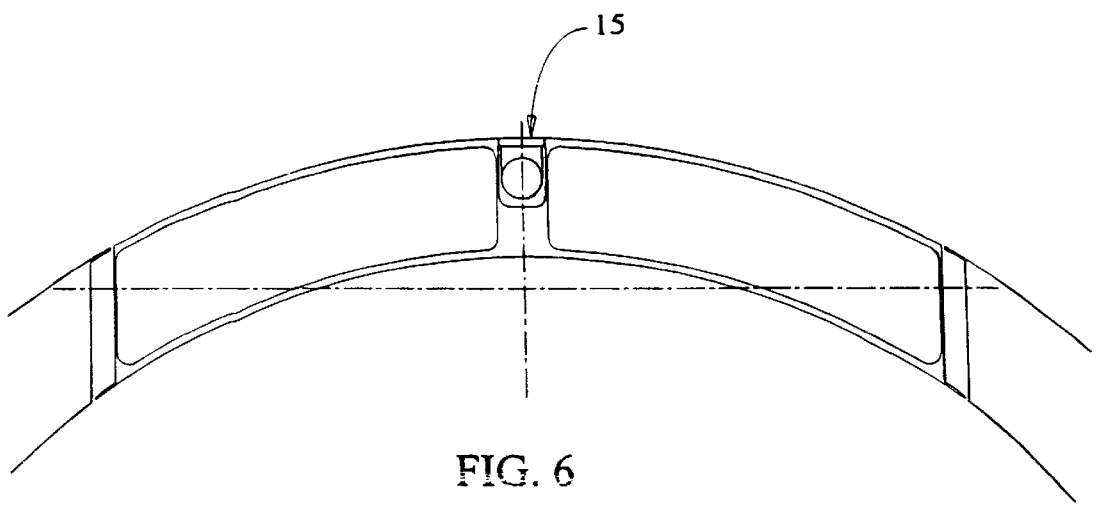
FIG. 6 is a cross-sectional view taken along line VI—VI in FIG. 4.
Figure 4:
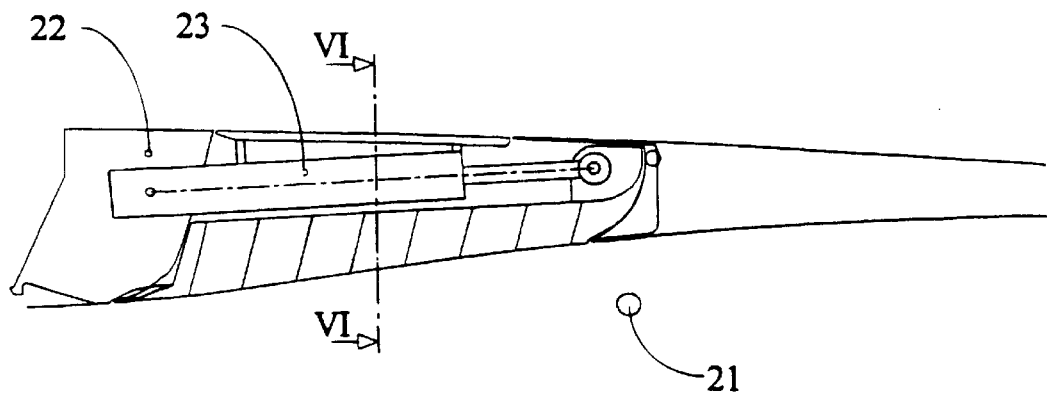
FIG. 4 is a view similar to FIG. 2 illustrating the connection of the actuator to the thrust reverser door with the thrust reverser door in the forward thrust position.
Figure 5:
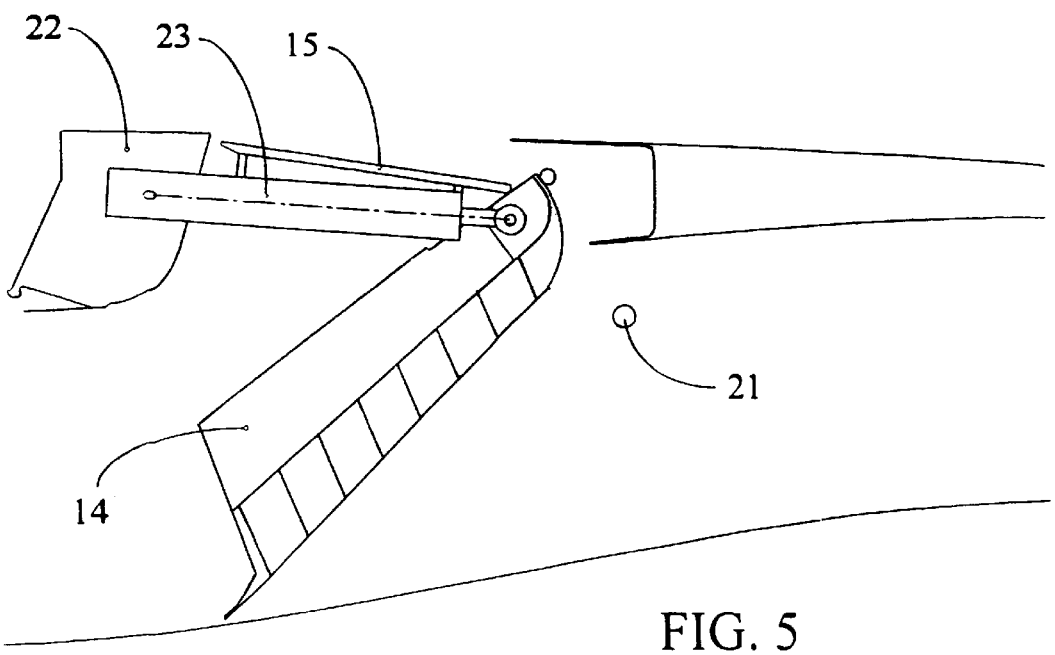
FIG. 5 is a view similar to FIG. 4, but illustrating the thrust reverser door in the reverse thrust position.

As best illustrated in FIGS. 4–6, at least one linear actuator 23 is associated with the stationary cowling structure 22 and moves the door by its connection with an extendible and retractable rod. The thrust reverser door 20 may have a recess 14 to accommodate the actuator 23 when the door 20 is in the forward thrust position, as illustrated in FIGS. 4 and 6. A cover panel 15 is located so as to cover the recess 14 when the thrust reverser door is in the forward thrust position. An outer surface of the cover panel 15 will be substantially flush with the outer surface of the cowling, as illustrated in FIGS. 4 and 6. The cover panel 15 can be attached to the actuator 23 as illustrated in FIG. 5. As an alternative, the thrust reverser door 20 may be driven by one or more linear actuators attached to the sides of the thrust reverser doors and to adjacent portions of the stationary cowling.

Figure 7:
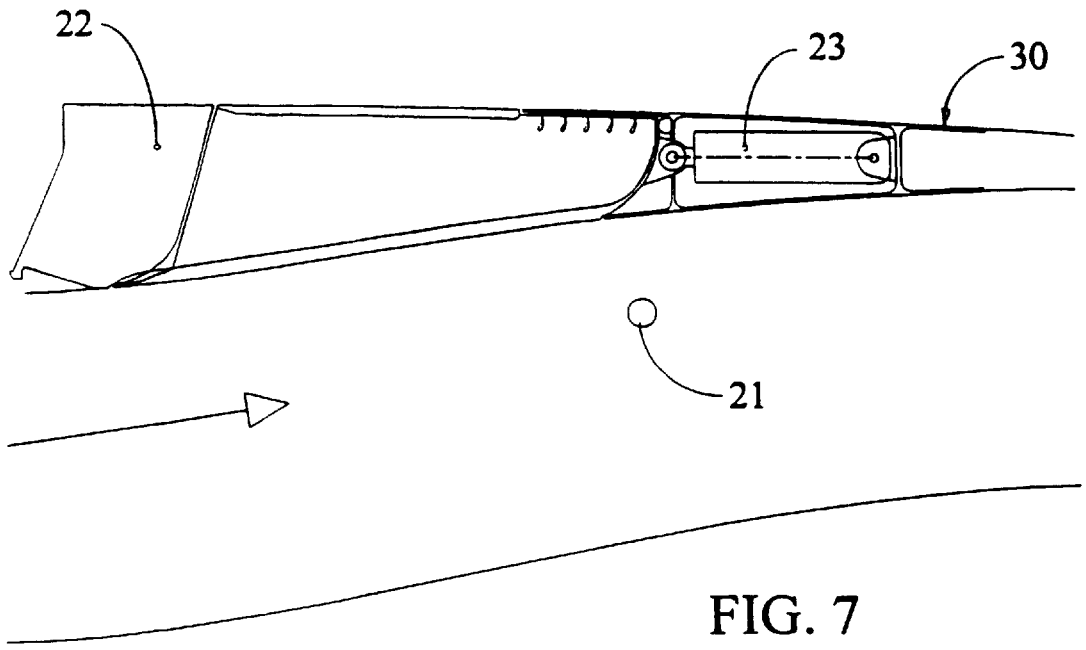
FIG. 7 is a partial, longitudinal cross-sectional view illustrating a second embodiment of the invention with the thrust reverser door in the forward thrust position.
Figure 8:
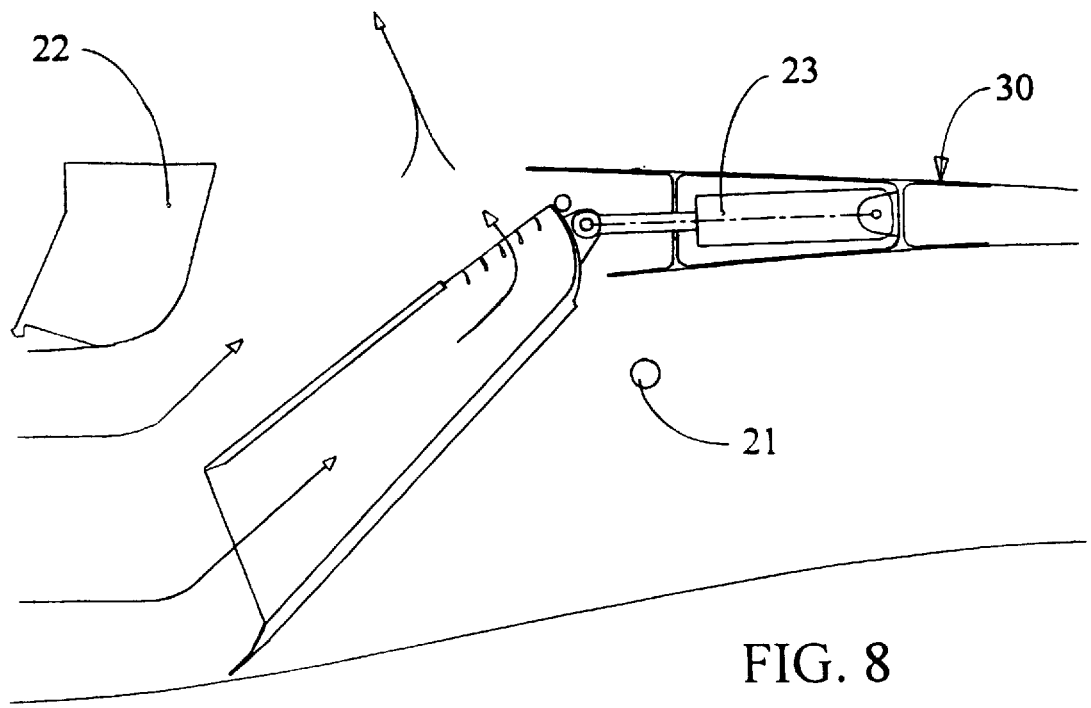
FIG. 8 is a view similar to FIG. 7, but illustrating the thrust reverser door in the reverse thrust position.

Additional locations of the actuator 23 are illustrated in FIGS. 7–10. In FIGS. 7 and 8, the linear actuator 23 extends between the rear portion of the cowling 30 and the thrust reverser door 20 such that the actuator 23 is located to the rear of the reverse thrust opening in the cowling. Again, extension and retraction of the rod of the actuator 23 will cause the thrust reverser door 20 to pivot about the axis 21 between the forward and the reverse thrust positions.

Figure 9:
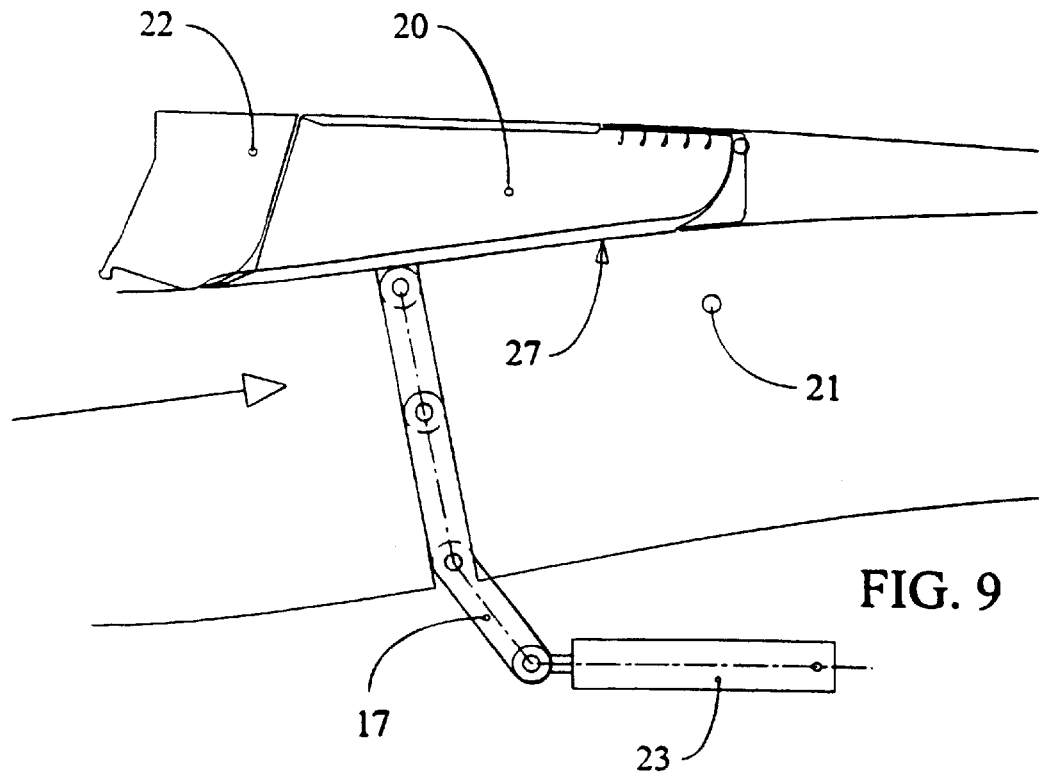
FIG. 9 is a partial, longitudinal cross-sectional view illustrating a third embodiment of the invention with the thrust reverser door in the forward thrust position.
Figure 10:
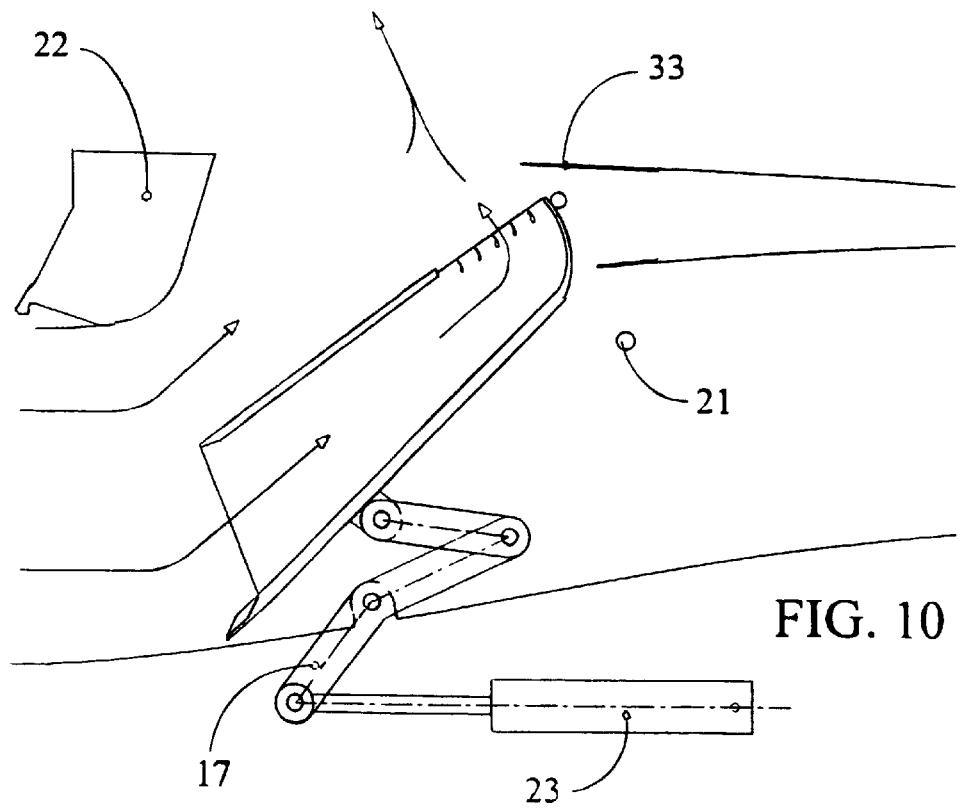
FIG. 10 is a view similar to FIG. 9, but illustrating the thrust reverser door in a reverse thrust position.

In FIGS. 9 and 10, the actuator 23 is mounted within the jet engine housing 25 and is connected to the thrust reverser door 20 by a mechanical linkage mechanism 17. The linkage mechanism may comprise a first link member pivotally attached to the jet engine housing 25 and to an end of a second link member, which is also pivotally attached to the thrust reverser door 20. Again, extension and retraction of the rod of the actuator 23 will cause the thrust reverser 20 to pivot about the axis 21 between the forward and reverse thrust positions. An advantage of this system is that the mechanical linkage may form an over-center locking mechanism which will mechanically lock the thrust reverser door 20 in the forward thrust position to preclude inadvertent deployment. Since the forward portion of the cowling 22 no longer supports the weight of the actuator and no longer bears the forces exerted thereon by the actuator, this structure can be made lighter than in the known prior art systems. Depending upon the configuration of the linkage mechanism 17, the actuator will move the door by either a pulling, or a pushing force.

Figure 11:
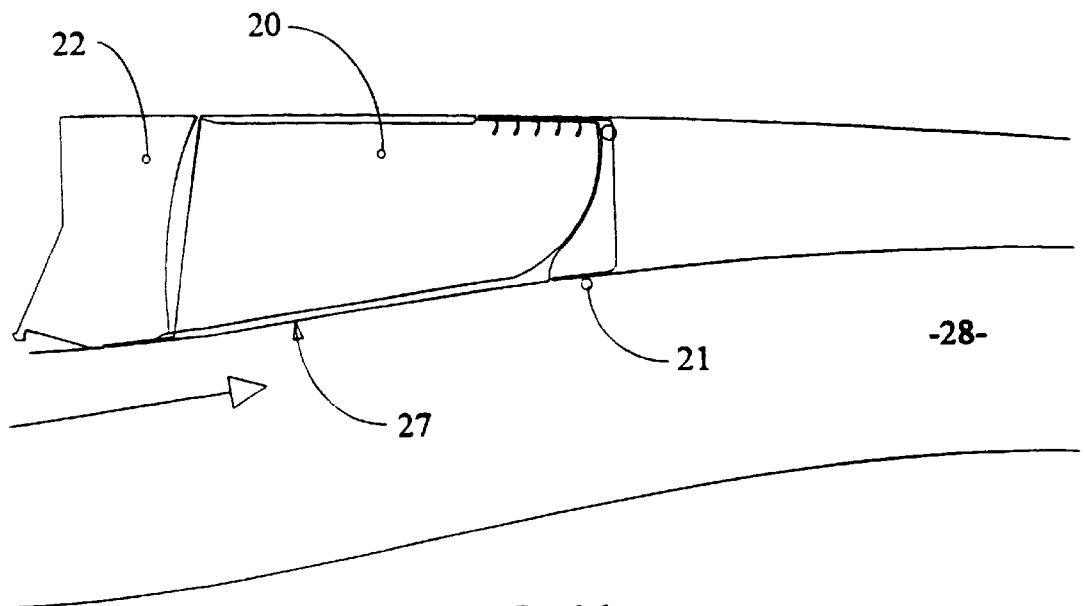
FIG. 11 is a partial, longitudinal, cross-sectional view illustrating a fourth embodiment of the invention with the thrust reverser door in the forward thrust position.
Figure 12:
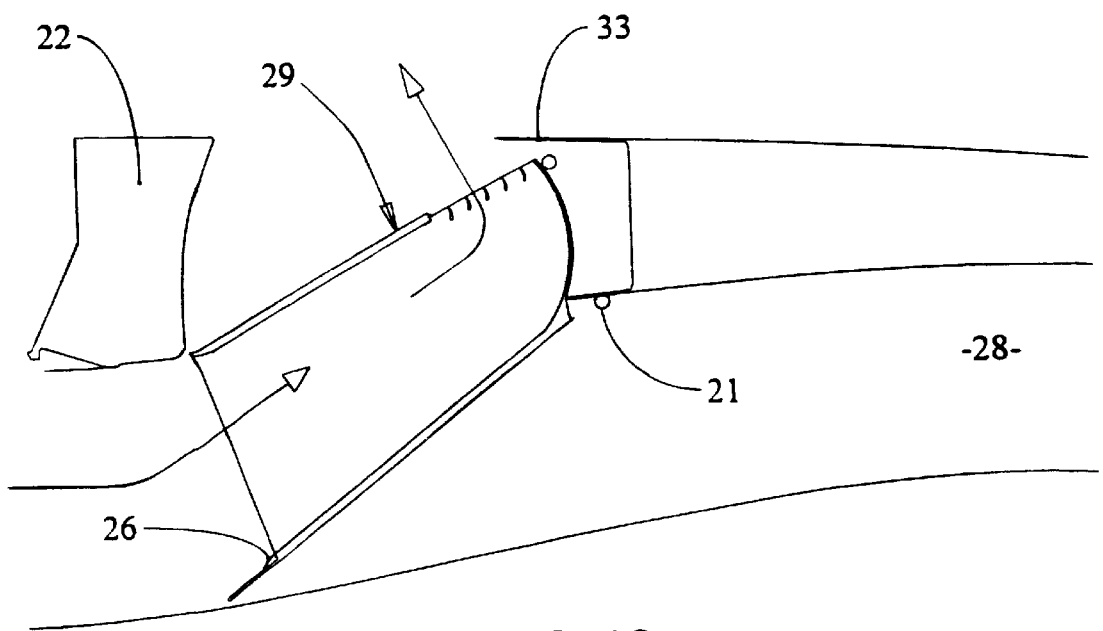
FIG. 12 is a view similar to FIG. 11, but illustrating the thrust reverser door in the reverse thrust position.

In the embodiment illustrated in FIGS. 11 and 12, the height of the front opening of the thrust reverser door is substantially equal to the height of the annular duct 28 at an axial position corresponding to the front edge of the door 20 such that virtually all of the gas in the gas flow duct 28 will pass through the passage 37 and be directed in a reverse thrust direction through the second opening 32.

Figure 13:
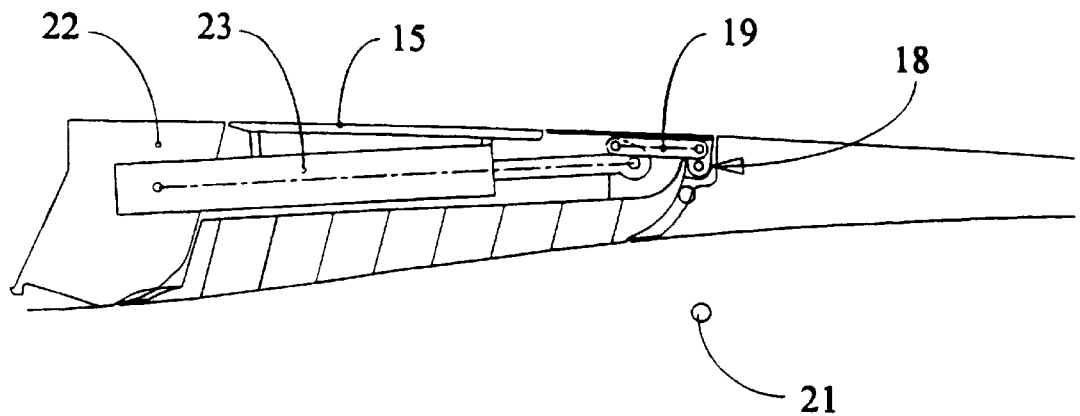
FIG. 13 is a partial, longitudinal, cross-sectional view illustrating a fifth embodiment of the invention with the thrust reverser door in the forward thrust position.
Figure 14:
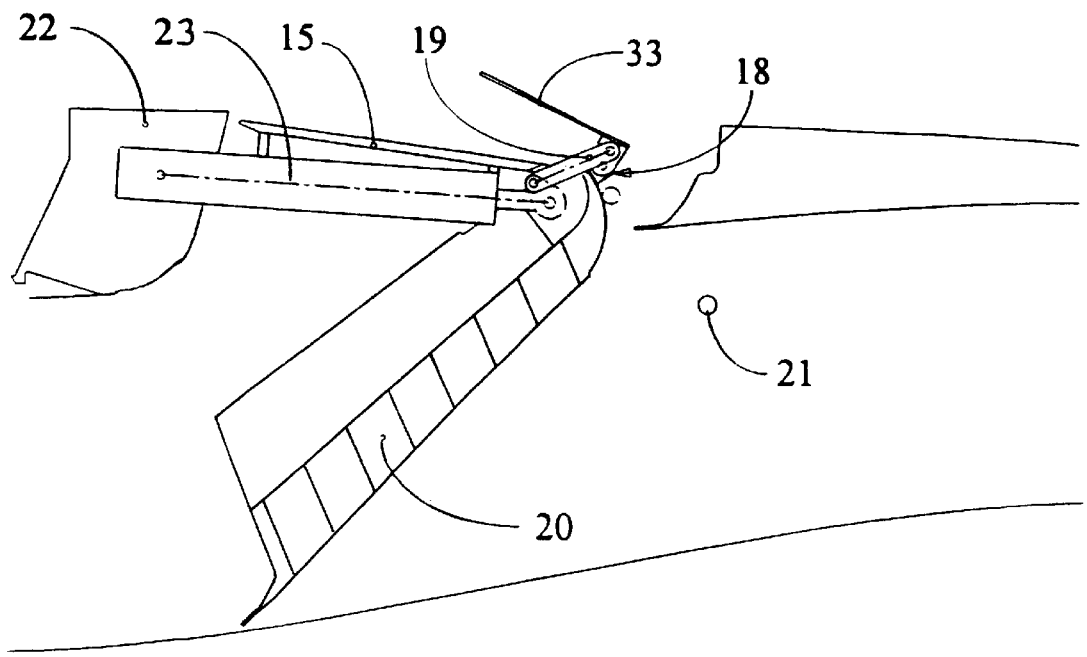
FIG. 14 is a view similar to FIG. 13, but illustrating the thrust reverser door in the reverse thrust position.

In the embodiment illustrated in FIGS. 13 and 14, the panel 33 is pivotally attached to the thrust reverser door 20 and does not form a fixed portion of the rear cowling. A connecting member 18 pivotally attaches the panel 33 to the rear portion of the door 20. Linkrod 19 is pivotally connected to the connecting member and to the end of the extendible and retractable rod of actuator 23. As can be seen, when the thrust reverser door 20 is in the forward thrust position, as illustrated in FIG. 13, the panel 33 will cover the second opening 32 and will be displaced from the opening 32 when the door 20 is moved to the reverse thrust position, illustrated in FIG. 14. In this embodiment, the panel 33 may act on the gases emanating from the second opening 32 in order to direct the gases in a more forward direction thereby enhancing the reverse thrust effect of the gases. The panel 33 may also be configured to impart a desired direction to the reverse thrust gas. The panel 33 may also have a spring acting thereon urging the panel 33 toward the position illustrated in FIG. 13.

Figure 15:
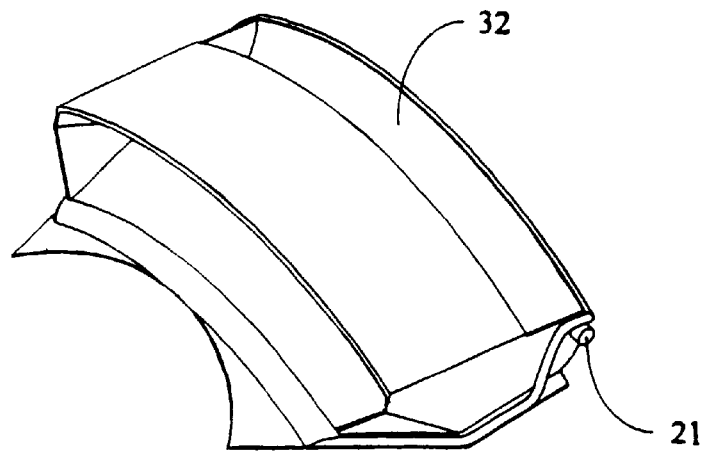
FIGS. 15–17 are perspective views of three embodiments of the thrust reverser door structure according to the present invention.
Figure 16:
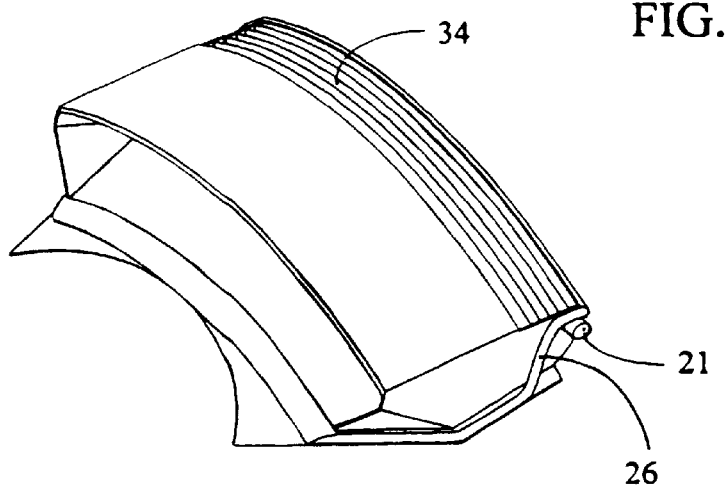
Figure 17:
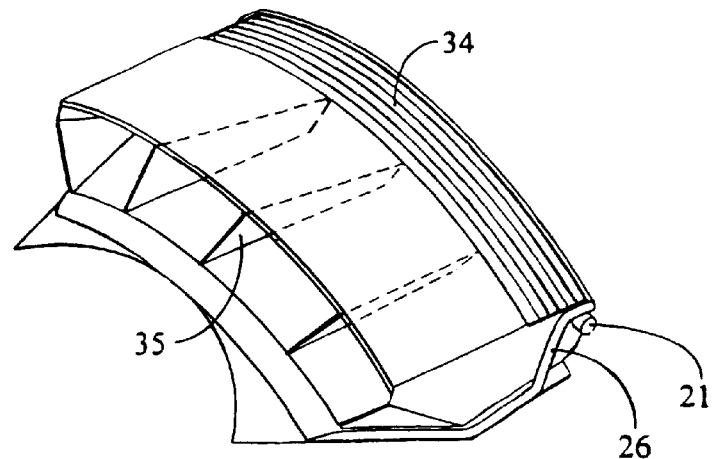
Figure 18:
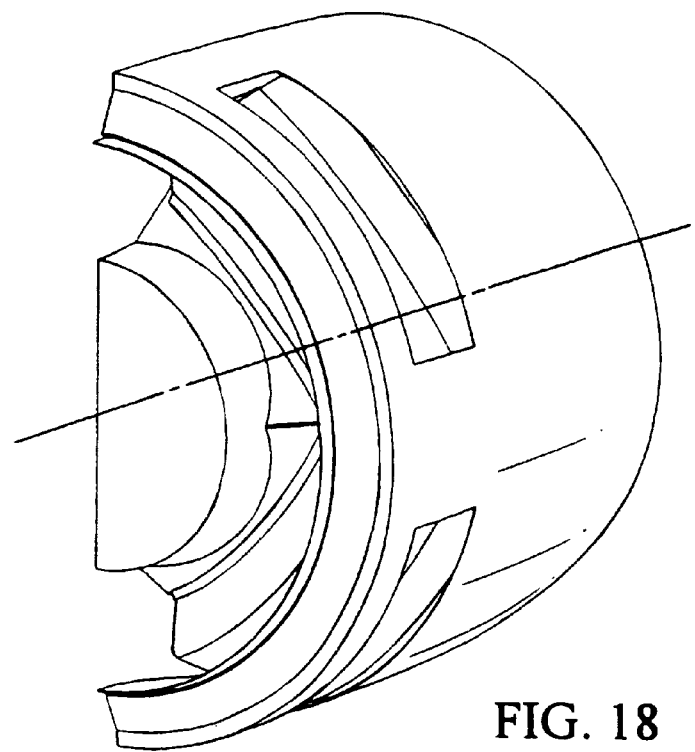
FIG. 18 is a partial, front perspective view of a cowling incorporating the thrust reverser according to the present invention with the thrust reverser doors in the reverse thrust positions.
Figure 19:
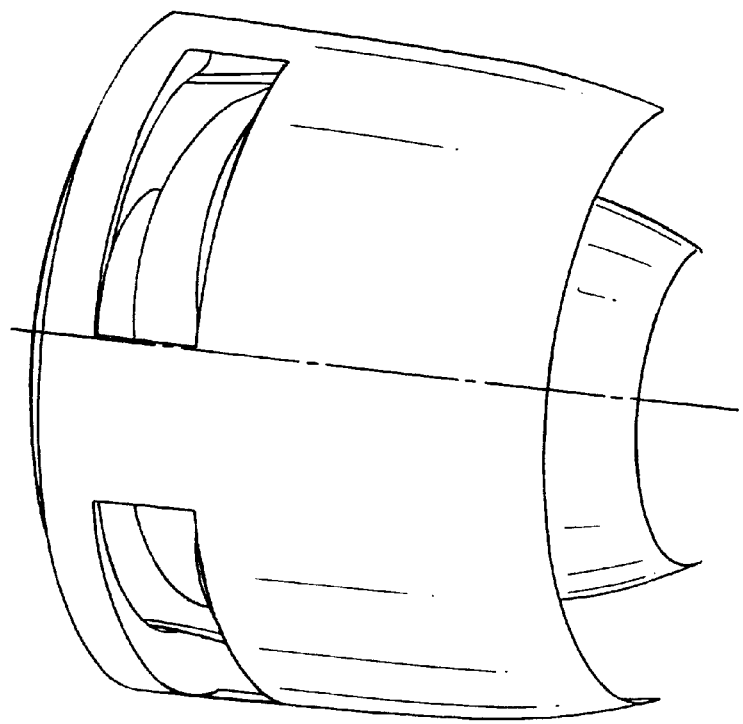
FIG. 19 is a side view of a cowling incorporating the thrust reverser according to the present invention with the thrust reverser doors in the reverse thrust positions.

FIGS. 15–17 illustrated various configurations of the thrust reverser door utilized with the present invention. In FIG. 15, the second opening 32 is entirely free and open. In FIG. 16, a plurality of guide vanes 34 extend transversely across the opening 32 to guide and direct the gases passing through the opening. In FIG. 17 a plurality of generally longitudinally extending partitions 35 are located with in the passage 37 to, again, impart a desired direction to the gases passing through the passage. The orientation, number and configuration of the guide vanes and the partitions will, of course, be varied according to each application of the present invention to achieve optimal directing of the reverse thrust gases.

Figure 20:
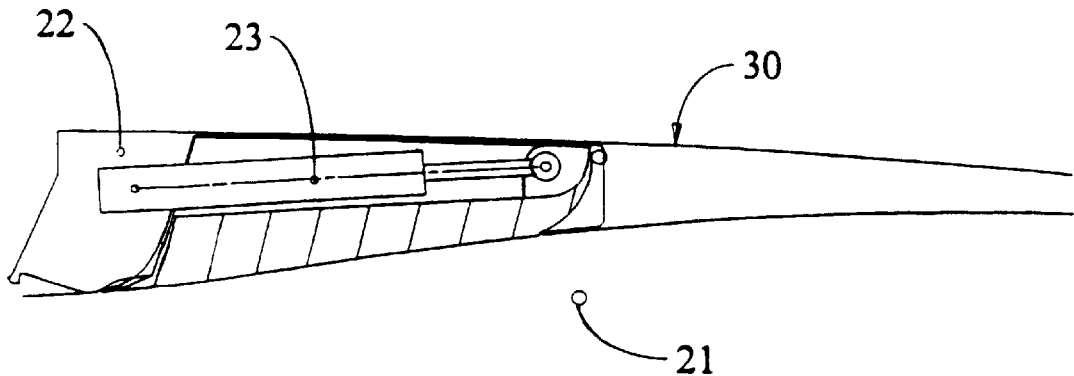
FIG. 20 is a partial, longitudinal, cross-sectional view of a sixth embodiment of the present invention with the thrust reverser door in the forward thrust position.
Figure 21:
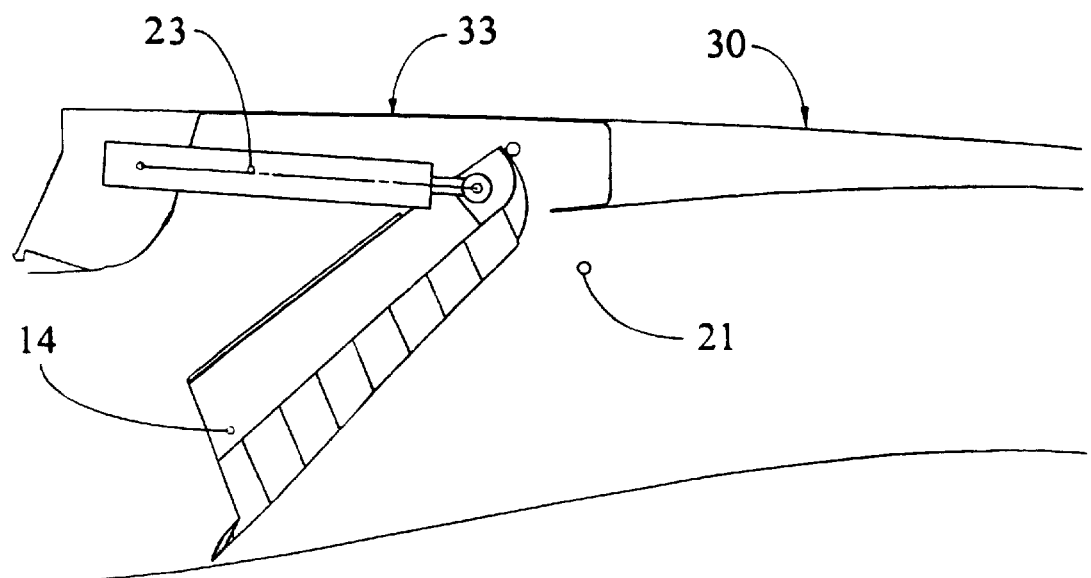
FIG. 21 is a view similar to FIG. 20, but illustrating the thrust reverser door in the reverse thrust position.

In FIGS. 20 and 21, an embodiment is illustrated in which the panel 33 extends from the rear portion of the cowling 30 to the front portion 22 directly over the actuator 23. The transverse width of the panel 23 is sufficient to cover the actuator and the opening of the recess 14 in the door 20 to accommodate the actuator when the thrust reverser door 20 is in the forward thrust position. In this embodiment, the cover panel 15, previously described, is eliminated. The configuration of the opening 32 in the door 20 may be non-linear, or oblique, or may assume any desired shape depending upon the desired directions to be imparted to the reverse thrust gases. Obviously, the contours of the panel 33 should be such to complement the configuration of the opening 32.

In some applications, the positioning of the panel 33 near the opening 32 may have an undesired affect on the gases emanating through the opening 32. This may be circumvented, as illustrated in FIGS. 22–25, by connecting the panel 33 to a rear movable cowl 40 which forms the cowling, along with the forward fixed cowl 22. The movable rear cowl 40 translates in a direction illustrated by arrow 44 substantially parallel to the longitudinal axis of the cowling between a first position, illustrated in FIG. 22 and a second position illustrated in FIG. 23 in which the rear cowl 40 is displaced from the forward cowl 22. Such translation may be accomplished by a system of actuators and the rear cowl 40 may be connected to the fixed cowl 22 by a system of guides, both of which are well known in the art and need not be described in further detail.

Figure 22:
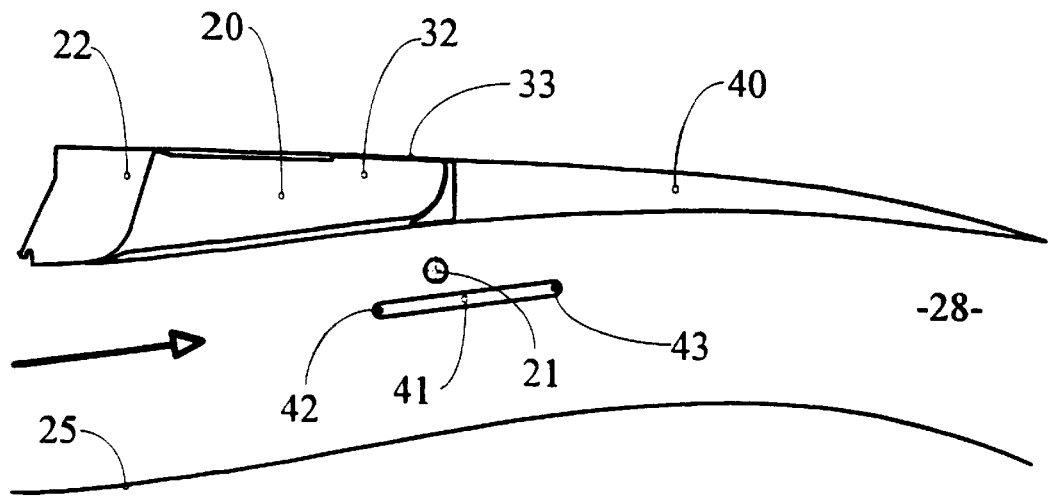
FIG. 22 is a partial, longitudinal, cross-sectional view of a seventh embodiment of the present invention with the thrust reverser door in the forward thrust position.
Figure 23:
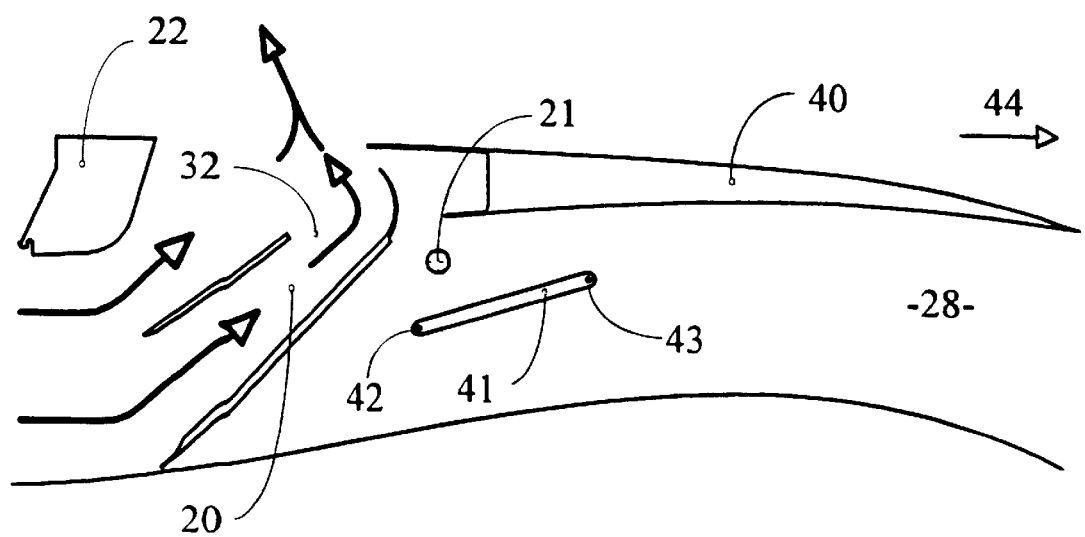
FIG. 23 is a view similar to FIG. 22, but illustrates the thrust reverser door in the reverse thrust position.
Figure 24:
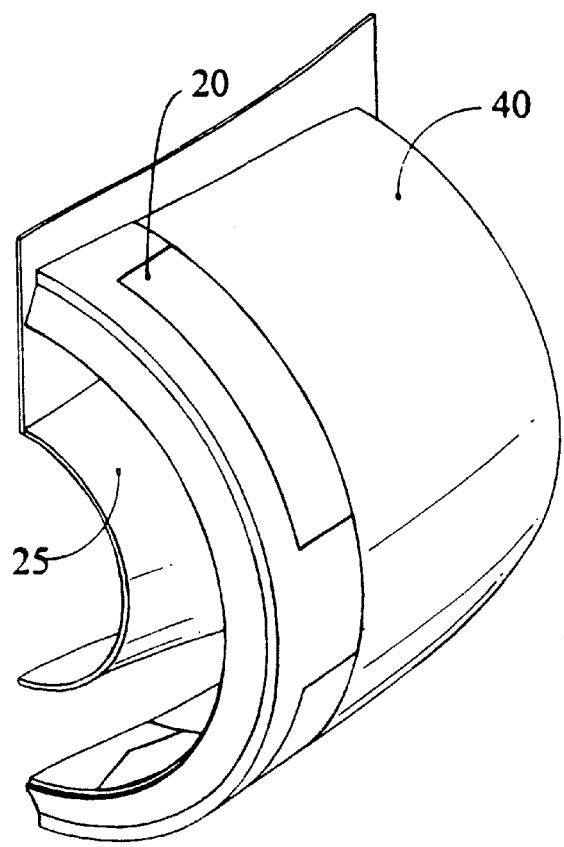
FIG. 24 is a partial, perspective view of a cowling incorporating the thrust reverser of the present invention with the thrust reverser doors in the forward thrust positions.
Figure 25:
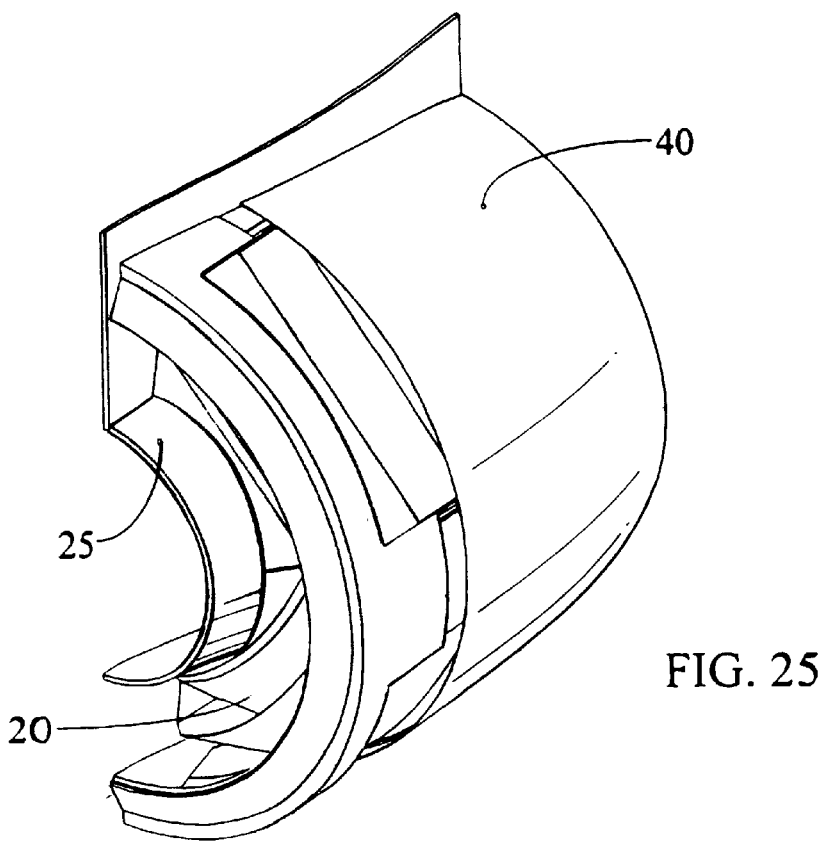
FIG. 25 is a view similar to FIG. 24, but illustrates the thrust reverser doors in the reverse thrust positions.

In this embodiment, the thrust reverser door 20 is connected to the movable rear cowl 40 by one or more linkrods 41 connected to the thrust reverser door 20 at 42 and to the rear cowl 40 at 43. Such linkrods coordinate the movement between the thrust reverser door 20 and the rear cowl 40 such that, when the rear cowl 40 is in its first position, the thrust reverser door 20 is in the forward thrust position (as illustrated in FIGS. 22 and 24) and when the rear cowl 40 is in the second position, the thrust reverser door 20 is in the reverse thrust position (as illustrated in FIGS. 23 and 25). The actuator for driving this embodiment may be connected to either the thrust reverser door 20, or to the rear cowl 40, since the linkrod connection 41 will coordinate the movements between these two elements. As illustrated in FIG. 23, when the rear cowl is in the second position, the panel 33 is displaced from the opening 32 to maximize the desired reverse thrust performance.

Alternatively, separate actuators may be provided for the rear cowl 40 and the thrust reverser door 20, thereby eliminating the necessity of the connecting links 41. The length of movement of the rear cowl 40 depends upon the overlap between the opening 32 and the panel 33. The larger the overlap, the larger must be the movement of the rear cowl 40 in order to withdraw the panel 33 from the opening 32.

Figure 26:
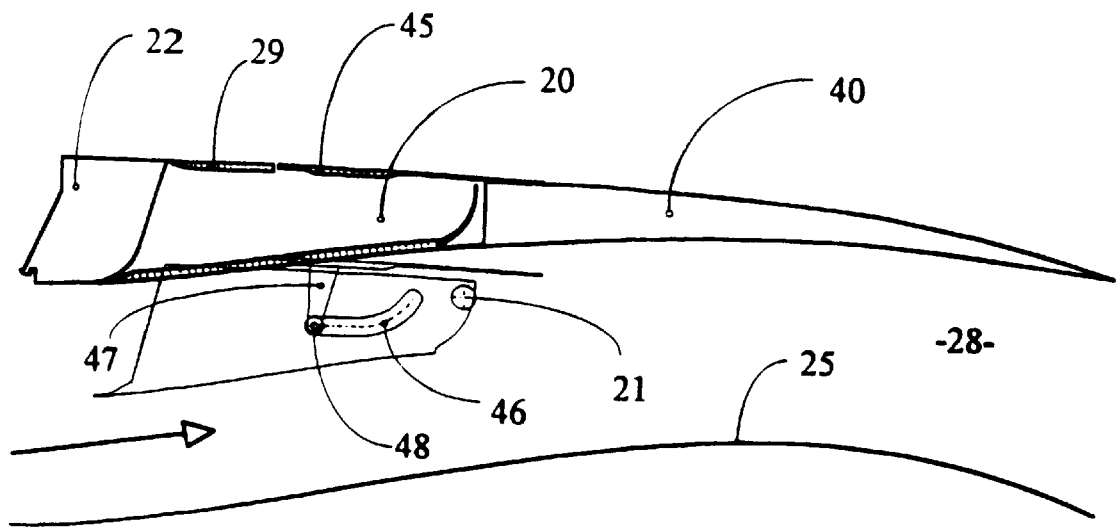
FIG. 26 is a partial, longitudinal, cross-sectional view of an eighth embodiment of the present invention with the thrust reverser doors in the forward thrust position.
Figure 27:
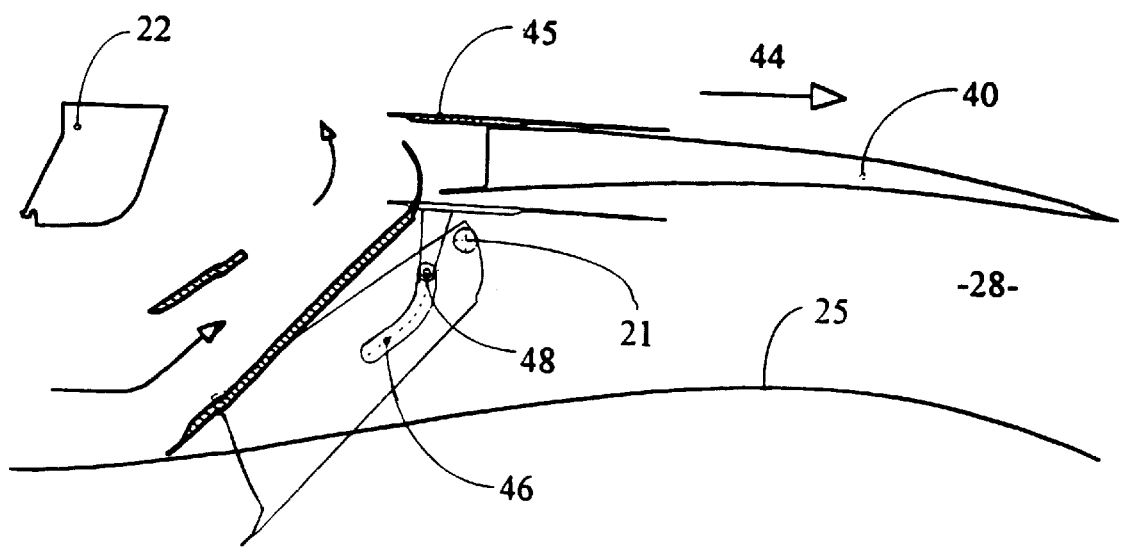
FIG. 27 is a view similar to FIG. 26 illustrating the thrust reverser door in the reverse thrust position.
Figure 28:
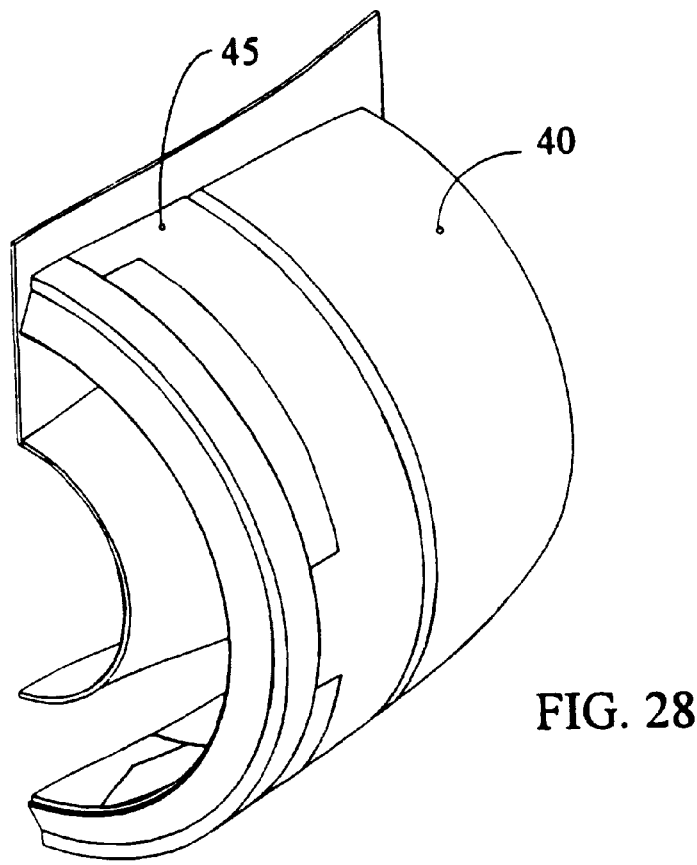
FIG. 28 is a perspective view of a cowling incorporating the thrust reverser of FIG. 26 with the thrust reverser doors in the forward thrust positions.
Figure 29:
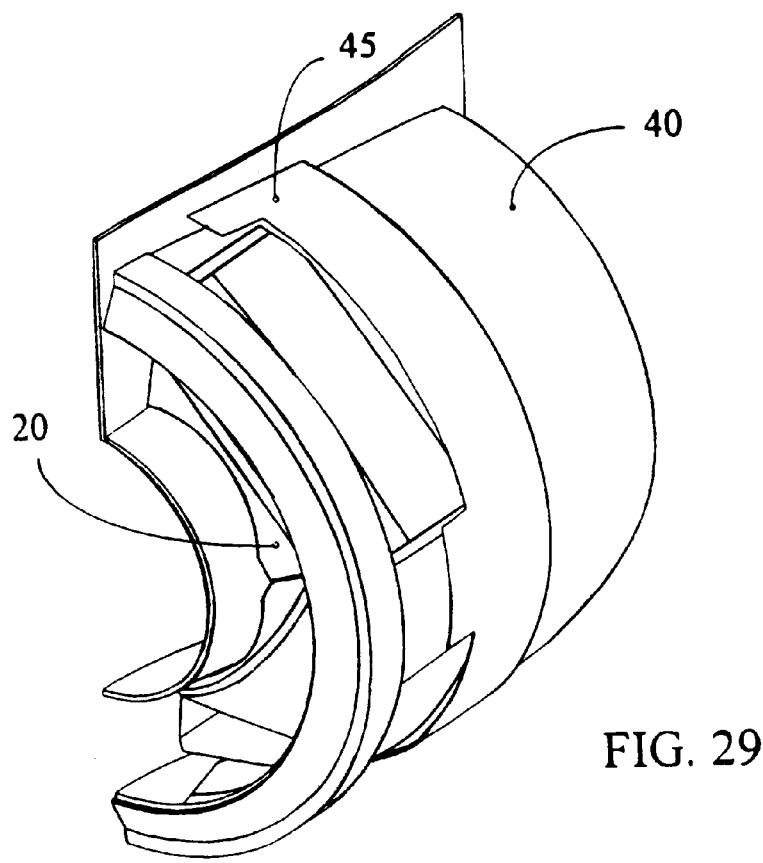
FIG. 29 is a view similar to FIG. 28 but illustrating the thrust reverser doors in the reverse thrust positions.

FIGS. 26–29 illustrate another embodiment of the invention in which the panel 45 is movable relative to the stationary rear cowl 40. When the thrust reverser door is in the forward thrust position, as illustrated in FIGS. 26 and 28, the movable panel 45 covers the second opening 32 and is substantially flush with the outer surface of the cowling. As illustrated in FIG. 27, the panel 45 is movable in the direction of arrow 44, generally parallel to a longitudinal axis of the cowling. Such mechanism for accomplishing this movement is well known in the art. The panel 45 is connected to the thrust reverser door 20 by a drive member 48, in this particular instance formed as part of movable panel 45, which slidably engages an elongated slot 46 formed in one or both opposite side portions of the thrust reverser door 20. The shape of the elongated slot 46 is such that, as the panel 45 moves rearwardly, the thrust reverser door 20 moves from the forward thrust position, towards the reverse thrust position, illustrated in FIGS. 27 and 29. The drive member 48 may be connected to the movable panel 45 by one or more supports 47.

In a variation of this embodiment, the thrust reverser door 20 may form the passage 37 by a "U"-shaped recess, in which case the panel 45 will completely cover this recess when the thrust reverser door is in the forward thrust position.

Although the elongated slot has been illustrated as formed in the thrust reverser door and the drive member 48 has been illustrated associated with the movable member 45, such may be reversed without exceeding the scope of this invention, or other known linkrod systems may be utilized to coordinate the movement of movable panel 45 and the door 20. As in the previous embodiments, the forward edge of the panel 45 may be shaped so as to impart a desired directional flow to the gases emanating from the opening 32.

Figure 30:
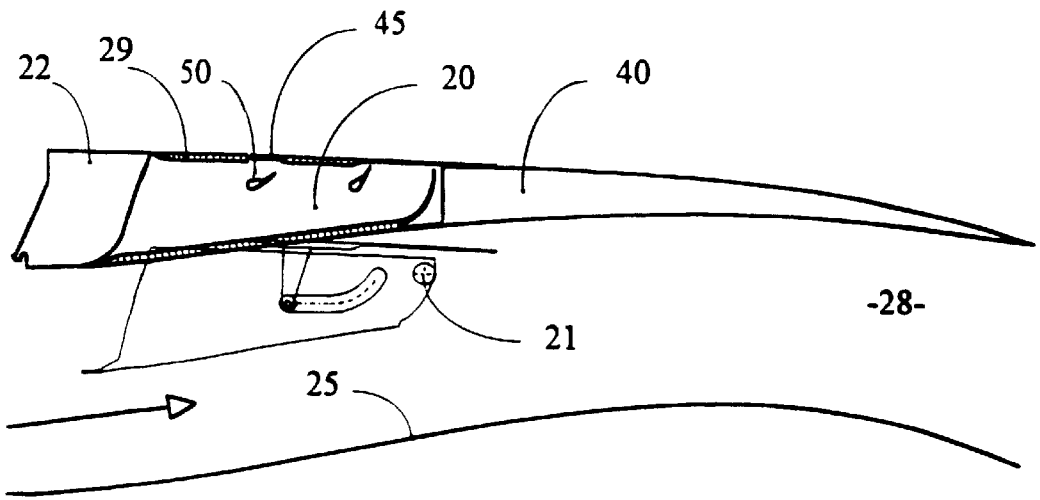
FIG. 30 is a partial, longitudinal, cross-sectional view illustrating a ninth embodiment of the present invention with the thrust reverser door in the forward thrust position.
Figure 31:
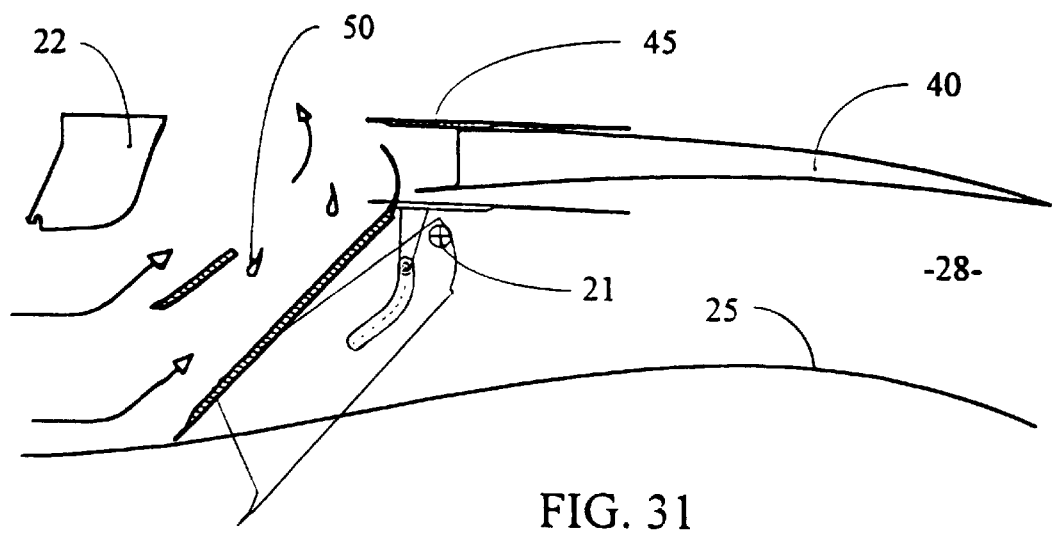
FIG. 31 is a view similar to FIG. 30, but illustrating the thrust reverser door in the reverse thrust position.

The reverse thrust gas flow may also be guided by guide vanes 50 extending through the passage 37, as illustrated in FIGS. 30 and 31. The vanes 50 may assume an aerodynamic cross-sectional configuration and may be positioned so as to impart the desired flow direction to the reverse thrust gases. Quite obviously, the number, configuration, orientation and location of the vanes 50 will vary according to each particular application of the invention. Guide vanes 50 may also be mounted to the cowling structure 22 as desired.

Figure 32:
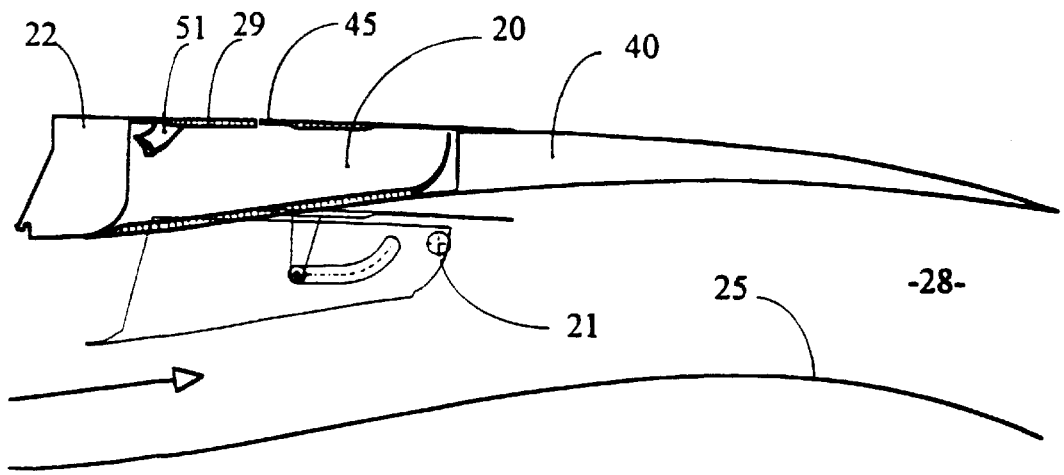
FIG. 32 is a partial, longitudinal, cross-sectional view illustrating a tenth embodiment of the invention with the thrust reverser door in the forward thrust position.
Figure 33:
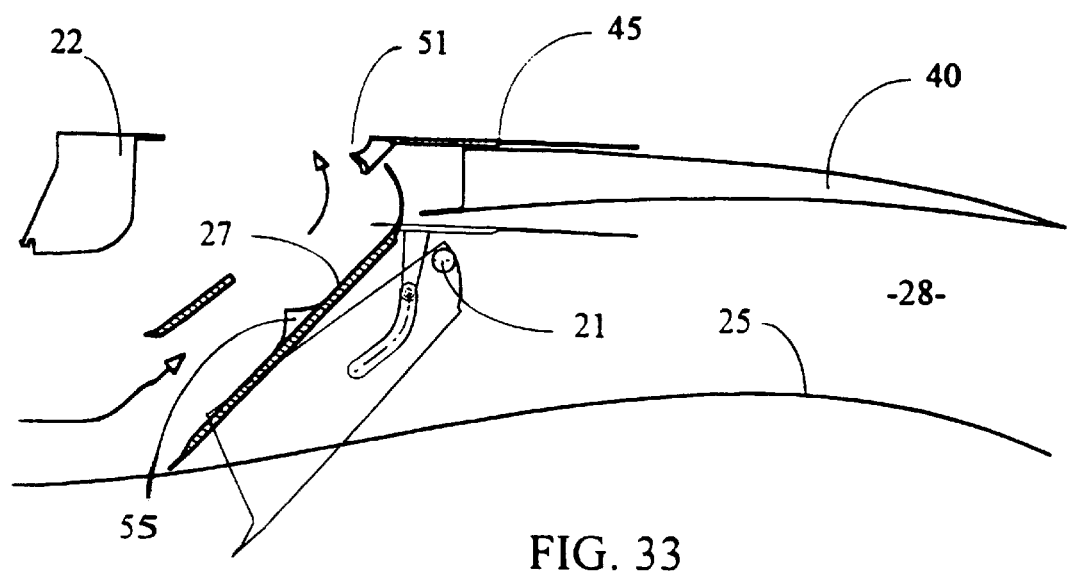
FIG. 33 is a view similar to FIG. 32 but illustrating the thrust reverser door in the reverse thrust position.

A flow guide vane 51 may also be attached to an inner, forward edge portion of the movable panel 45, as illustrated in FIGS. 32 and 33. Again, the configuration, location, size and number of such vanes 51 may vary according to each particular application of the invention. The vanes may be continuous with the inner curvature of the door 20, or they may be offset from the curvature. The vanes 51 may also be combined with the guide vanes 50, as illustrated in FIGS. 30 and 31.

Figure 34:
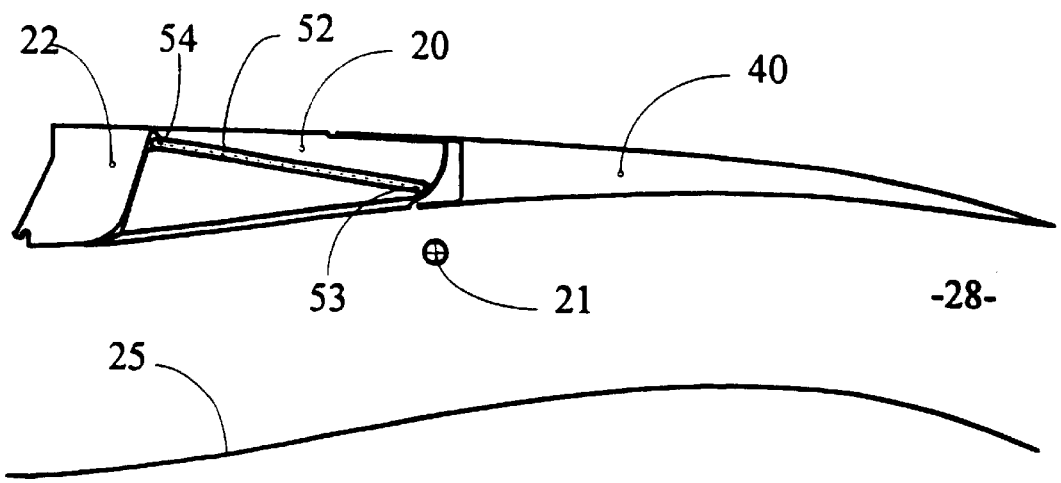
FIG. 34 is a partial, longitudinal, cross-sectional view of an eleventh embodiment of the thrust reverser according to the present invention with the thrust reverser door in the forward thrust position.
Figure 35:
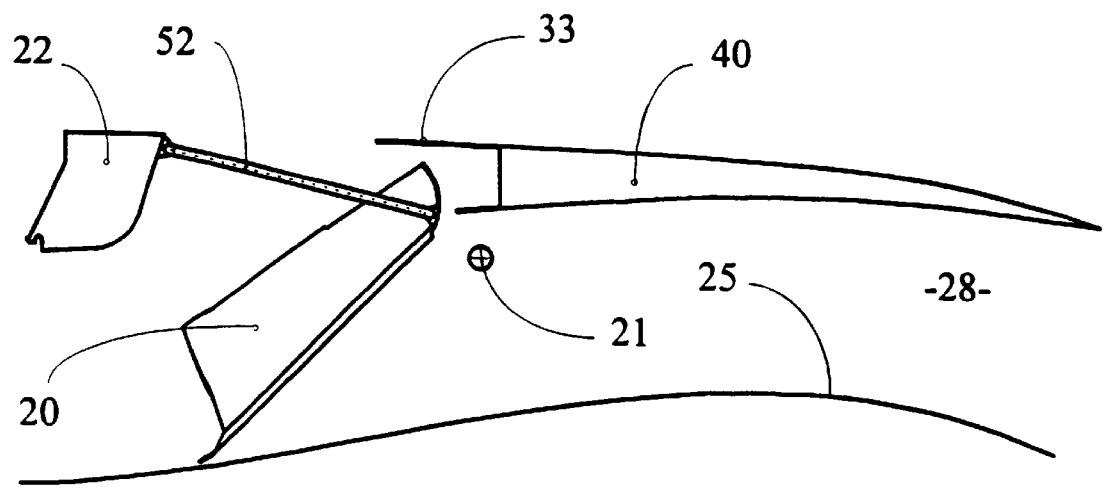
FIG. 35 is a view similar to FIG. 34, but illustrating the thrust reverser door in the reverse thrust position.

In all of the foregoing embodiments, the thrust reverser door 20 has been pivotally attached to the fixed cowling 22. As illustrated in FIGS. 34 and 35, the thrust reverser door 20 may be pivotally attached to the movable rear cowl 40 so as to pivot about axis 21, which axis will also translate with the movable cowl 40. In this embodiment, a linkrod 52 is connected to the stationary cowl 22 at 54 and to the thrust reverser door 20 at 53 such that translational movement of the rear cowl 40 will also cause the thrust reverser door 20 to pivot about the axis 21 between the forward reverse thrust positions.

In any of the aforedescribed embodiments, the inner panel 27 formed on the thrust reverser door 20 may be shaped to provide guidance of the gases flowing through the passage 37. Such guides may comprise one or more profiled rails 55, illustrated in FIG. 33, or it may comprise one or more guiding walls of a desired shape and size to direct the gas flow in accordance with the desired criteria.

Figure 36:
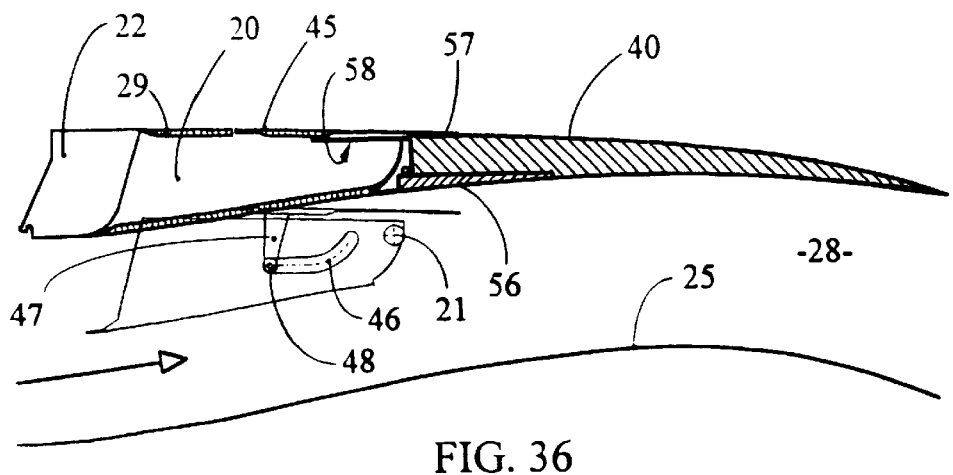
FIG. 36 is a partial, cross-sectional view illustrating a twelfth embodiment of the present invention with the thrust reverser door in the forward thrust position.
Figure 37:
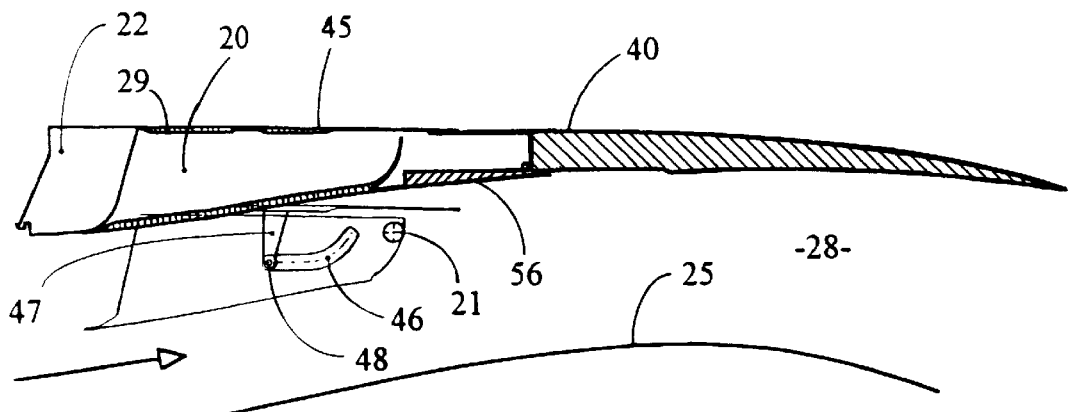
FIG. 37 is a view similar to FIG. 36, but illustrates the movable portion of the cowling located in a different position so as to adjust the cross-sectional area of the nozzle.
Figure 38:
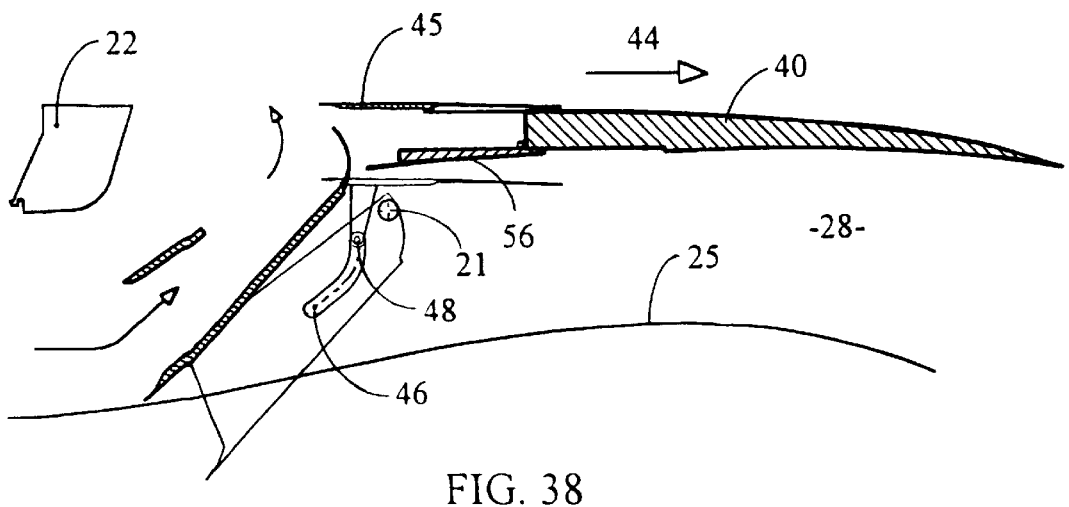
FIG. 38 is a view similar to FIG. 36, but illustrating the thrust reverser door in the reverse thrust position.

All of the embodiments illustrated in FIGS. 22–35 may be utilized with a structure which allows the varying of the cross-section of the annular duct 28 without degrading the performance of the reverse thrust system. FIGS. 36–38 illustrate the present invention utilized with a system in which the rear cowl 40 is movable along the longitudinal axis of the cowling so as to vary the cross-section of the annular duct 28. A rear stationary shroud 56 is incorporated into this structure and is located to the rear of the reverse thrust opening. An inner surface of the fixed shroud 56 forms a portion of the outer boundary of the gas flow duct 28. The means for translating the rear cowl 40 are well known in the art and need not be described in detail here. In the forward thrust mode, as illustrated in FIG. 36, the movable rear cowl 40 is in the first position, adjacent to the stationary cowl and the thrust reverser door 20 is in the forward thrust position. A seal 57 seals the junction between the stationary rear shroud 56 and the movable rear cowl 40. In this configuration, the movable rear cowl 40 has a forward portion 58 that is overlapped by a rear portion of the movable panel 45. The length of the overlap depends upon the translational displacement of the rear cowl 40 to vary the cross-section of the duct 28.

As illustrated in FIG. 37, the rear cowl 40 may be moved to the rear by a known control system to vary the cross-section of the gas flow duct 28. Such rearward displacement of the rear cowl 40 is independent of any movement of the movable panel 45. Thus, the thrust reverser door 20 remains in the forward thrust position with the opening 32 covered by movable panel 45. Provisions may be made for locking of the rear cowl 40 on the movable panel 45, on the stationary rear shroud 56, or at any other convenient site.

The reverse thrust configuration is illustrated in FIG. 38, wherein it can be seen that movable panel 45 has been moved towards the rear, in a direction of arrow 44 and overlaps the forward portion of the movable rear cowl 40 to a greater extent than in the forward thrust mode. As previously described, the thrust reverser door 20 has been moved to the reverse thrust position. Although a sequential deployment of the movable rear cowl 40 and the movable panel 45 has been illustrated, it is within the scope of this invention to simultaneously move these elements to the rear so as to achieve the reverse thrust mode.

The foregoing descriptions have been provided for illustrative purposes only and should not be construed as in any way limiting this invention, the scope of which is defined solely by the appended claims.

We claim:

1. A thrust reverser for a turbojet engine having a cowling bounding a gas flow duct through which gases flow from a front towards a rear, the cowling having at least one reverse thrust opening communicating with the gas flow duct, the thrust reverser comprising:

a) a thrust reverser door having a forward portion and a rear portion, a first opening in the forward portion, a second opening in the rear portion and a passage communicating between the first and second openings, the thrust reverse door being pivotally attached to the cowling adjacent to the rear portion of the thrust reverser door so as to be movable between a forward thrust position, in which the thrust reverser door covers the at least one reverse thrust opening in the cowling such that an inner surface of the thrust reverser door forms a portion of a boundary of the gas flow duct and in which the first opening is blocked by the cowling, and a reverse thrust position, in which the forward portion of the thrust reverser door extends into the gas flow duct to constitute a flow-deflecting baffle which blocks the gas flow duct such that at least a portion of the gases flowing in the gas flow duct passes through the passage in the thrust reverser door and is thereby directed through the at least one reverse thrust opening in a reverse thrust direction; and, b) a rear panel which is located so as to cover the second opening in the thrust reverser door when the thrust reverser door is in the forward thrust position and to not cover the second opening when the thrust reverser door is in the reverse thrust position.

2. The thrust reverser of claim 1 wherein the cowling has an outer surface and wherein the pivot attachment between the thrust reverser door and the cowling is located such that no portion of the thrust reverser door extends outwardly beyond the outer surface of the cowling in both the forward and reverse thrust positions.

3. The thrust reverser of claim 1 wherein the rear panel is fixedly located on the cowling.

4. The thrust reverser of claim 1 further comprising at least one gas flow guide vane located in the second opening in the thrust reverser door.

5. The thrust reverser of claim 1 wherein the cowling has an outer surface and further comprising:

a) a recess in the thrust reverser door;

b) an actuator for moving the thrust reverser door between the forward and reverse thrust positions, at least a portion of the actuator located in the recess; and c) a cover panel covering the recess and substantially flush with the outer cowling surface when the thrust reverser door is in the forward thrust position.

6. The thrust reverser of claim 5 wherein the cover panel is connected to the actuator.

7. The thrust reverser of claim 5 wherein the cover panel is formed as a portion of the panel.

8. The thrust reverser of claim 1 further comprising an actuator connected to the thrust reverser door and to a portion of the cowling forwardly of the at least one reverse thrust opening.

9. The thrust reverser of claim 1 further comprising an actuator connected to the thrust reverser door and to a portion of the cowling rearwardly of the at least one reverser thrust opening.

10. The thrust reverser of claim 1 further comprising:
   a) a jet engine housing located within the cowling;
   b) a linear actuator located within the jet engine housing; and,
   c) a linkage mechanism connecting the linear actuator and the thrust reverser door such that the linear actuator moves the thrust reverser door between the forward and reverse thrust positions.

11. The thrust reverser of claim 1 wherein the first opening has a height substantially equal to a height of the gas flow duct at a corresponding location along a length of the gas flow duct.

12. The thrust reverser of claim 1 further comprising:
   a) a connector element pivotally connecting the panel to the rear portion of the thrust reverser door;
   b) an actuator connected to the thrust reverser door so as to move the thrust reverser door between the forward and reverse thrust positions; and,
   c) a link rod pivotally connected to the connecting element and the actuator.

13. The thrust reverser of claim 1 further comprising at least one partition located in the passage to direct the gas passing through the passage in a desired direction.

14. The thrust reverser of claim 1 wherein the cowling comprises a fixed forward cowl and a rear cowl movable with respect to the fixed forward cowl along a path substantially parallel to a longitudinal axis of the cowling between a first position adjacent to the fixed forward cowl and a second position displaced from the fixed forward cowl.

15. The thrust reverser of claim 14 wherein the panel is affixed to the rear cowl so as to move therewith.

16. The thrust reverser of claim 14 further comprising at least one link rod connecting the thrust reverser door and the rear cowl such that the thrust reverser door moves between the forward and reverse thrust positions as the rear cowl moves between the first and second positions.

17. The thrust reverser of claim 14 wherein the thrust reverser door is pivotally connected to the movable rear cowl and further comprising a fixed length link rod connected to the fixed forward cowl and to the thrust reverser door such that, as the rear cowl moves toward the second position, the thrust reverser door moves toward the reverse thrust position.

18. The thrust reverser of claim 1 wherein the panel is movably connected to the cowling so as to translate along a path of movement substantially parallel to a longitudinal axis of the cowling between a first position wherein the panel covers the second opening in the thrust reverser door and a second position wherein the panel is displaced from the second opening.

19. The thrust reverser of claim 18 further comprising a mechanism connecting the panel to the thrust reverser door such that when the panel is in the first position the thrust reverser door is in the forward thrust position and when the panel is in the second position the thrust reverer door is in the reverse thrust position.

20. The thrust reverer of claim 19 wherein the mechanism comprises:
   a) a slot formed in one of the thrust reverser door and panel; and,
   b) a drive member on the other of the thrust reverser door and panel and slidably engaging the slot.

21. The thrust reverser of claim 18 further comprising at least one flow guide vane located in the passageway.

22. The thrust reverser of claim 8 further comprising at least one flow guide vane on the panel adjacent to a forward edge.

* * * * *

UNITED STATES PATENT AND TRADEMARK OFFICE
CERTIFICATE OF CORRECTION

Page 1 of 2

PATENT NO. : 5,983,625
DATED : November 16, 1999
INVENTOR(S) : GONIDEC et al.

It is certified that error appears in the above-identified patent and that said Letters Patent is hereby corrected as shown below:

On the title page, item:

Item [56] after last line of References Cited, insert -- 924,283  8/1947

France --

Column 10, line 25, change "a" to -- outer and inner panels which form an enclosed --.

Column 11, line 4, before "panel" insert -- rear --.

Column 12, line 1, before "panel" insert -- rear --;

line 16, before "panel" insert -- rear --;

lines 19 and 21, after "wherein the" insert -- rear --;

lines 24, 25 and 27, before "panel" insert -- panel --;

lines 27 and 29, change "reverer" to -- reverser;

lines 32 and 34, before "panel" insert -- rear --;

line 37, change "8" to -- 18 --; and

UNITED STATES PATENT AND TRADEMARK OFFICE
CERTIFICATE OF CORRECTION

PATENT NO. : 5,983,625
DATED : November 16, 1999
INVENTOR(S) : Gonidec, et al.

It is certified that error appears in the above-identified patent and that said Letters Patent is hereby corrected as shown below:

Column 12, line 38, before "panel" insert -- rear --.

Signed and Sealed this

Twelfth Day of December, 2000

Attest:

Q. TODD DICKINSON

Attesting Officer

Director of Patents and Trademarks